No. 860,991. PATENTED JULY 23, 1907.
C. W. REYNOLDS.
FIRELESS COOKER.
APPLICATION FILED JUNE 16, 1906.

Witnesses,
Inventor,
Clifford W. Reynolds

UNITED STATES PATENT OFFICE.

CLIFFORD W. REYNOLDS, OF OMAHA, NEBRASKA.

FIRELESS COOKER.

No. 860,991.        Specification of Letters Patent.        Patented July 23, 1907.

Application filed June 16, 1906. Serial No. 322,061.

*To all whom it may concern:*

Be it known that I, CLIFFORD W. REYNOLDS, a citizen of the United States, residing at Omaha, in the county of Douglas and State of Nebraska, have invented certain new and useful Improvements in Fireless Cookers, of which the following is a specification.

My invention relates in general to a heat retaining device whereby an article may be placed in a receptacle and remain for a considerable length of time at practically the same temperature as when first deposited in the containing chamber therein. Some of the advantages of my device being that a meal may be prepared many hours before it is to be served and kept in proper condition; or in case of articles requiring slow and continued cooking they are first heated to a sufficient cooking temperature and then placed in the containing chamber whereupon they proceed to cook without any further heat being applied. Nor is my invention applicable alone to retaining heat as it is so insulated that a cold substance may be placed therein and preserved equally as well as a heated substance; and in particular my invention pertains to the peculiar arrangement of the parts whereby all heat within the receptacle is directed toward the containing chamber while the exterior atmosphere is practically excluded.

Figure 1:
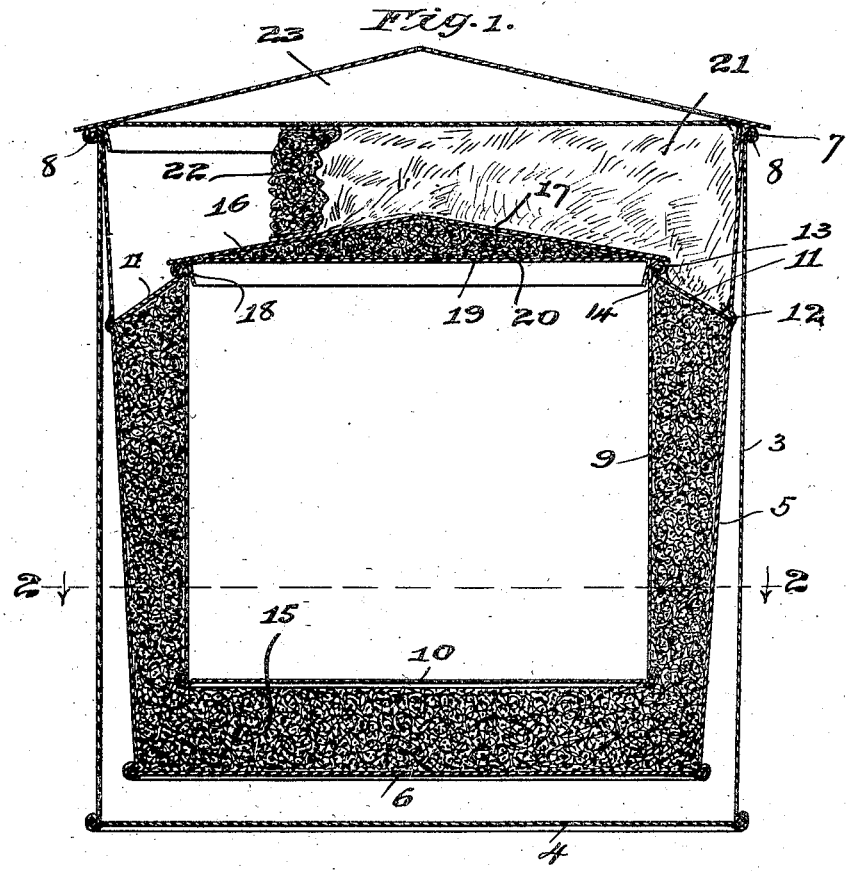
Figure 2:
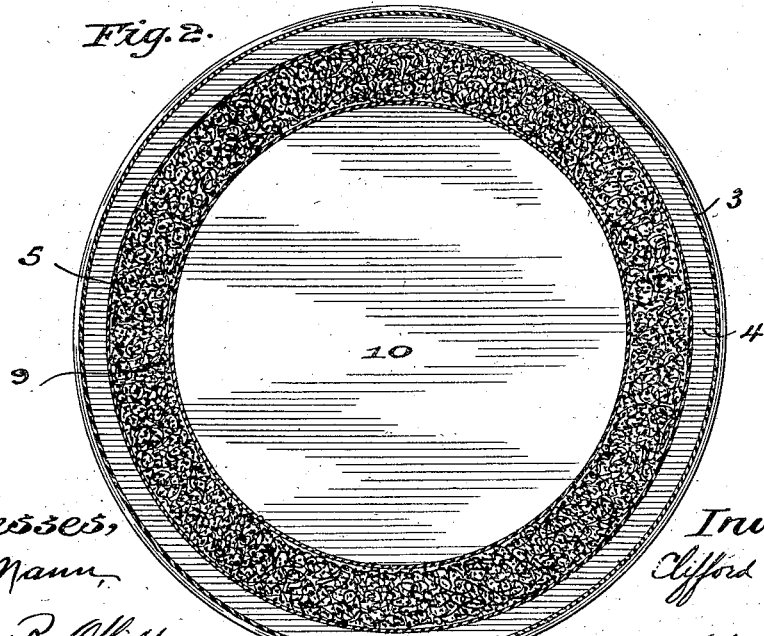

In the drawing Figure 1 is a longitudinal section of my device with a portion of the cushion broken away; and Fig. 2 is a cross-section on the line 2—2 of Fig. 1.

Referring more particularly to the drawing, 3 represents the outer wall of the receptacle, preferably circular, constructed of galvanized iron and provided with a double seamed bottom 4 that is soldered at the seams.

5 is an inner casing provided with a double seamed bottom 6, the upper edges of the two casings being turned, as shown at 7, about the wire 8 and soldered thereto, while the wall of said casing 5 converges downwardly to crowd the heat as it rises in the confined air space formed between the two casings. The containing chamber 9 is provided with a double seamed bottom 10, similar to the bottoms 4 and 6, and separated from the casing 5 by a collar 11, the outer edge of which is seated in a bead 12 in the inner casing, and its inner edge turned with the top of the containing chamber, as shown at 13, about the wire 14, both edges being soldered thereto, and the outer edge of the collar meeting the inner casing at a point below its inner edge, where it is connected to the containing chamber, for a reason hereinafter explained.

Confined between the wall of the inner casing, containing chamber and collar is the filling or insulation 15 preferably composed of magnesia plastic cement, mineral wool or similar fillings containing air cells. 16 is a cover to the containing chamber and is provided with a dome-shaped top 17, to deflect the heat toward the containing chamber, and a wedge rim 18; there being confined between the dome and the bottom 19 of the cover an insulation 20 that is preferably composed of the same material as the insulation 15.

The pillow or cushion 21 is filled with magnesia plastic cement, 22, mineral wool or the like and rests upon the dome of the inner cover and collar, falling below the top of the containing chamber and thereby preventing the escapement of any air that might leak out around the cover. The cover 23 of the whole device is constructed similar to the cover 16 only somewhat larger to fit the outer casing and is herein shown, as having a confined air space between the walls instead of a filling.

Two of the salient features of my device lie in the converging wall of the inner casing and the angle at which the collar is disposed. The converging wall permits of a loose filling to be used, since it prevents the packing or settling of the same, which would destroy the small air cells therein and considerably diminish the efficiency of the device, and it also serves to deflect the heat towards the containing chamber. The collar being disposed at an angle aids to deflect the heat, as it rises, toward the containing chamber, and, furthermore, permits the cushion to be seated below the top of the containing chamber, thus confining more securely the atmosphere therein.

It is obvious that the precise arrangement of the parts is immaterial, and therefore without limiting myself to the details of construction herein described and shown what I claim is:

I claim:

1. A fireless cooker comprising an outer casing, an inner casing having a downwardly converging wall, a fixed containing chamber, a confined air space between said casings, a filling substance between said inner casing and said containing chamber, and a cover for said outer casing, substantially as described.

2. A fireless cooker comprising an outer casing, an inner casing having downwardly converging sides, a permanently situated containing chamber within said inner casing, a collar disposed at an angle, and a filling arranged between said inner casing and said containing chamber, a confined air space between said outer and inner casings, and a cover for said outer casing, substantially as described.

3. A fireless cooker comprising an outer casing provided with a cover, an inner casing having downwardly converging sides, a containing chamber provided with a cover, a downwardly slanting collar secured to said containing chamber and set in a bead in said inner casing, a filling containing air cells between said inner casing and containing chamber, a confined air space between said outer and inner casings, and an insulation arranged between said covers, substantially as described.

4. A fireless cooker comprising an outer and an inner casing secured together at their tops, said inner casing provided with downwardly converging sides, a containing chamber within said inner casing, a filling substance and a collar disposed downwardly and arranged between said inner casing and containing chamber, a cover for said outer casing and for said containing chamber, and a non-conducting substance arranged between said covers, substantially as described.

CLIFFORD W. REYNOLDS.

Witnesses:
 BRYCE CRAWFORD,
 WM. O. GILBERT.